Figure 4:
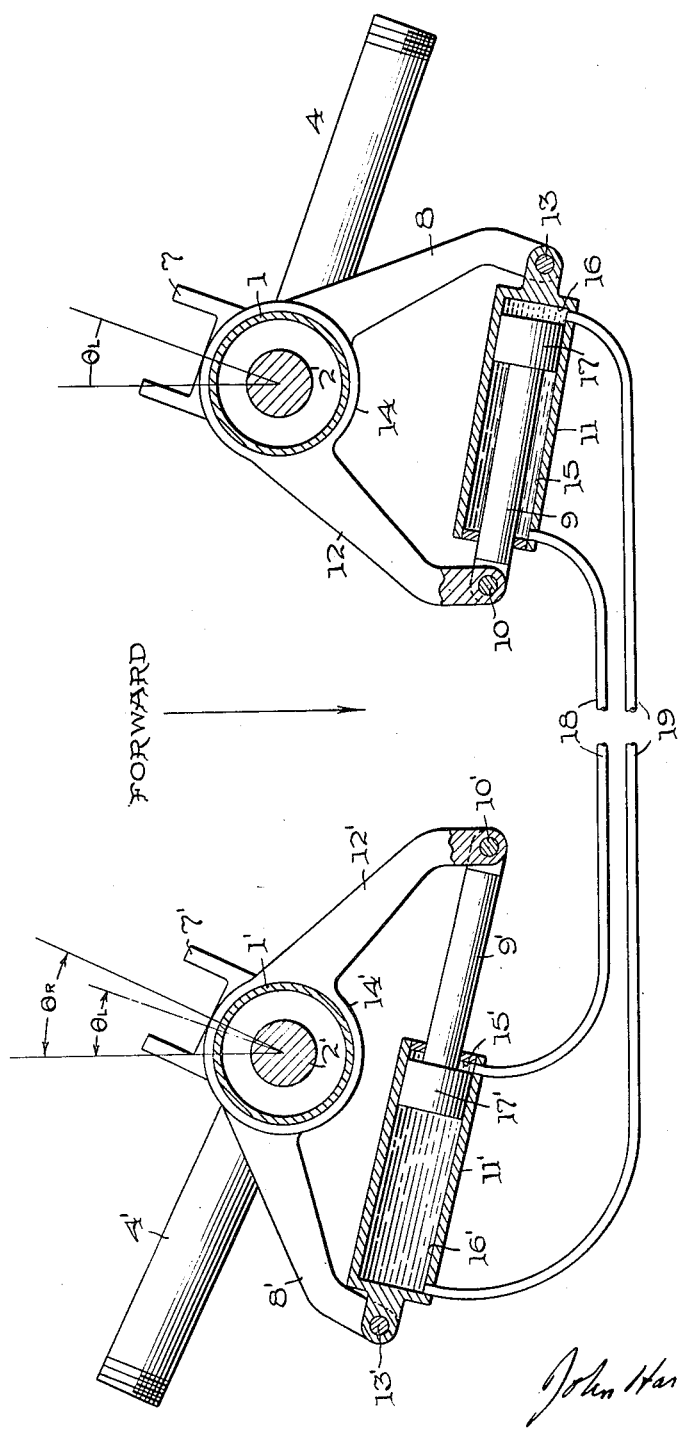

Jan. 6, 1953          J. H. GEISSE          2,624,534
AIRPLANE CROSS-WIND UNDERCARRIAGE
Filed Jan. 26, 1948          3 Sheets-Sheet 1
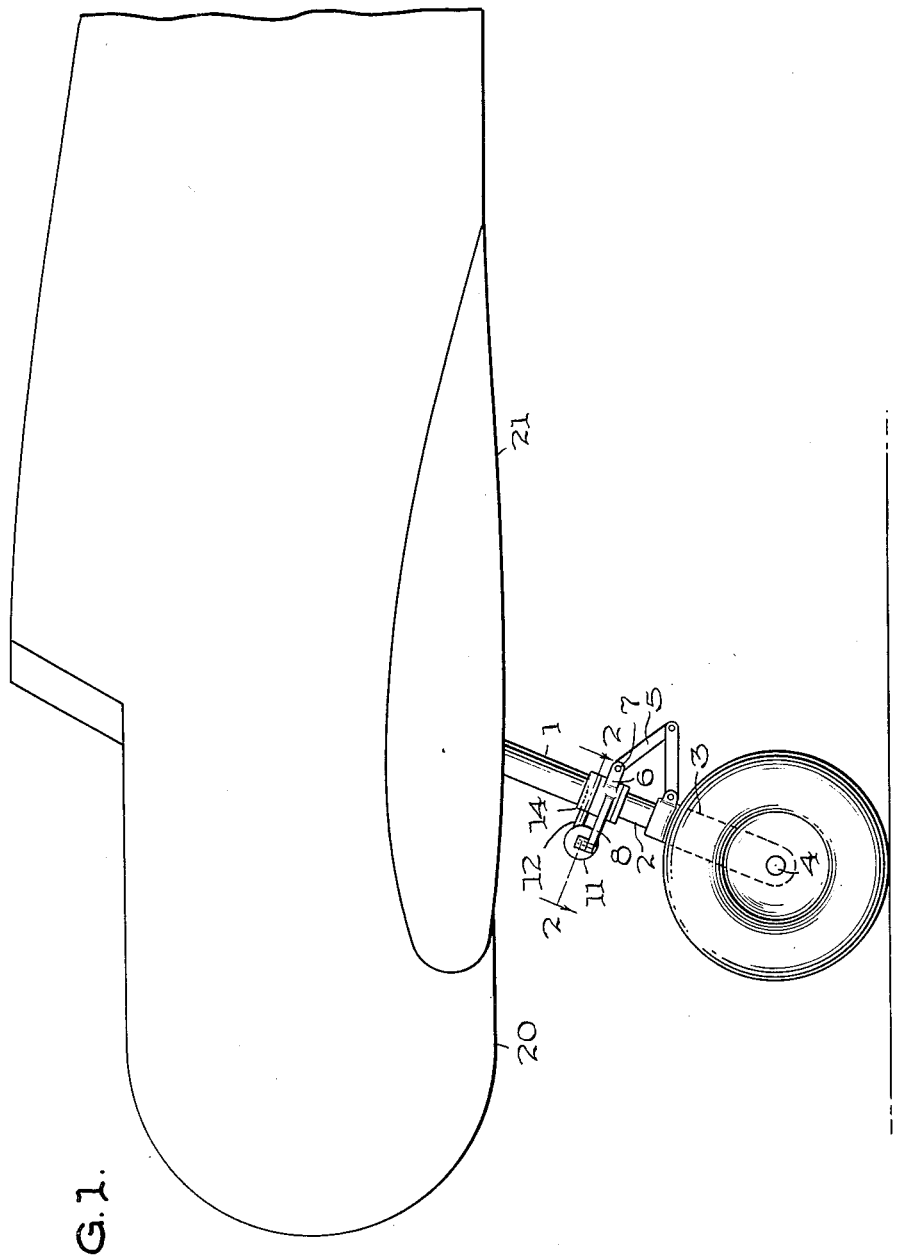
INVENTOR.
John Harlin Geisse Jan. 6, 1953 J. H. GEISSE 2,624,534
AIRPLANE CROSS-WIND UNDERCARRIAGE
Filed Jan. 26, 1948 3 Sheets-Sheet 2
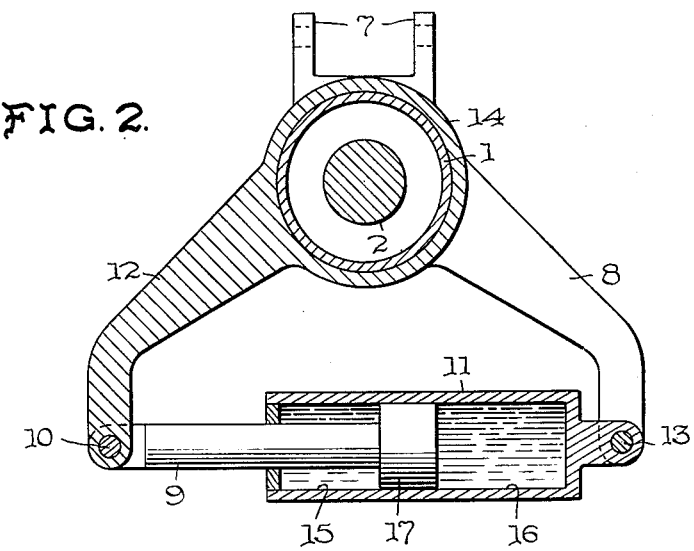
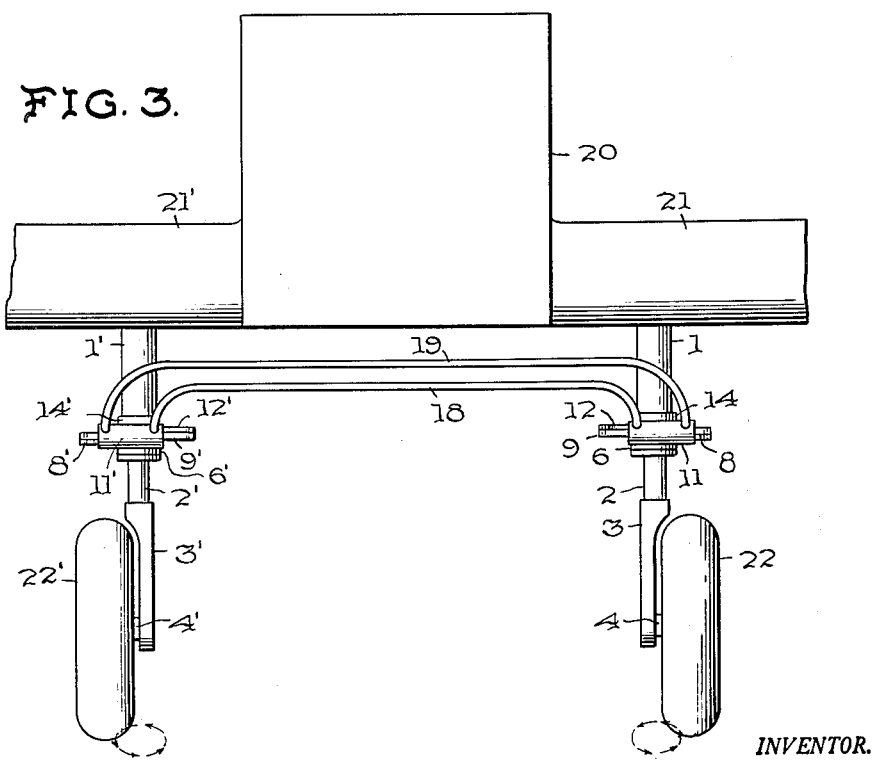
INVENTOR.
John Harlin Geisse Jan. 6, 1953   J. H. GEISSE   2,624,534
AIRPLANE CROSS-WIND UNDERCARRIAGE
Filed Jan. 26, 1948   3 Sheets-Sheet 3

INVENTOR.
John Harkin Geisse

Patented Jan. 6, 1953

2,624,534

UNITED STATES PATENT OFFICE 2,624,534

AIRPLANE CROSS-WIND UNDERCARRIAGE

John Harlin Geisse, Madison, Wis.

Application January 26, 1948, Serial No. 4,228

3 Claims. (Cl. 244—103)

My invention relates to improvements in airplane undercarriages adapted to cross wind landings and has for its objective the simplification of such undercarriages.

In such undercarriages the main wheels are castered and being castered they are characteristically susceptible to shimmy. To prevent this shimmy hydraulic dampers consisting of a double chamber pump with a leakage path between the chambers have been used. In addition to these shimmy dampers it has been customary to provide some other mechanism such as cams or springs to provide some centering force and static stability when inclined caster axes are used. However, neither cams nor springs can provide proper centering when the wheels are offset sidewise from the caster axes and the use of such an offset would simplify construction in many cases.

My invention consists of providing means whereby the hydraulic shimmy dampers are made to provide the desired centering force and in such a manner that wheel offset may be used.

My invention is shown in the accompanying drawings of which Fig. 1 is a side elevation of an airplane incorporating an embodiment thereof, Fig. 2 is a section of the left hand strut taken on the line 2—2 of Fig. 1, Fig. 3 is a front elevation of the airplane, and Fig. 4 shows sections of the right and left hand struts corresponding to Fig. 2 but with the wheels in a castered position.

In this embodiment of my invention I use the airplane shock struts to serve as caster spindles and caster spindle bearings in addition to their usual function of absorbing landing shocks.

In all views 1, 1' are the caster spindle bearings which in this case are the outer cylinders of the shock struts, and 2, 2' are the caster spindles which are the inner cylinders of the shock struts and are free to reciprocate and rotate in the outer cylinders. The wheel forks 3, 3' are attached to the lower ends of the caster spindles 2, 2' and carry the wheel axles 4, 4' on which are mounted the wheels 22, 22'. The caster spindle bearings or outer shock strut cylinders 1, 1' are attached to the airplane wings 21, 21' which are in turn attached to the fuselage 20.

Collar 6 is rotatably mounted on the outer strut cylinder 1, and is constrained to rotate in unison with the inner cylinder 2 by the jackknife element 5 attached to the lug 7, which is integral with the collar 6. Forwardly extending arm 8, is integral with the collar 6, and hence is also constrained to rotate in unison with the inner shock strut cylinder 2, and the axle 4.

Collars 14, 14' are rigidly attached to the outer shock strut cylinders 1, 1' and have forwardly extending arms 12, 12' integral therewith.

Shimmy damper cylinders 11, 11' are pivotably attached to the arms 8, 8' by the pins 13, 13'. Shimmy damper pistons 17, 17' are pivotably engaged to the arms 12, 12' by means of the piston rods 9, 9' and the pins 10, 10'.

The pistons 17, 17' divide the space within the cylinders 11, 11' into four chambers 15, 15' and 16, 16' and the customary leakage paths between chambers 15 and 16 are omitted. Instead, chambers 15 and 15' are connected together with the tube 18 and chambers 16 and 16' are connected by the tube 19.

Chambers 15, 15', 16, 16' and tubes 18 and 19 are completely filled with a suitable liquid. It is evident, therefore, that any movement of the piston rod 9 into or out of the cylinder 11 must be accompanied by an equal movement of the piston rod 9' out of or into cylinder 11' respectively. Hence wheels 22 and 22' will be constrained to caster in the same direction. It is also apparent that such movements would be accompanied by the flow of fluid through the tubes 18 and 19 and that the resistance to this flow will provide shimmy damping.

Referring now to Fig. 3, it will be apparent to one skilled in the art that when the spindles 2, 2' turn in the spindle bearings 1, 1' all points on the wheels 22, 22' will move in circles around the spindle axes and that with said axes inclined in a fore and aft direction the projection of these circles in the front elevation will be ellipses such as those shown for the points of contact of the wheels with the ground.

The direction of movement of these points for clockwise castering is shown by the arrows on the ellipses. From these it will be apparent that when the wheel turns toward the side on which its caster spindle is located, i. e. clockwise castering for the left wheel, the point of contact moves up and when it turns away from this side, i. e. clockwise castering for the right wheel, it moves down. The former would result in a lowering of the center of gravity of the airplane whereas the latter would result in raising it. It will be apparent, therefore, that if the wheel turning away from the side on which its caster axis is located is made to caster through a greater arc than does the wheel turning toward the side on which its caster axis is located, the net result can be made a raising of the center of gravity of the airplane. The weight of the airplane would then oppose castering in either direction and the undercarriage would be stable.

That the mechanism I have used to illustrate my invention will accomplish this desired performance can best be seen in Fig. 4 in which the right and the left hand mechanisms are shown in the positions they would be with the wheels castered in a clockwise direction. The separation of pins 10 and 13 has been made one inch less than obtains when the wheels are non-castered and the separation of pins 10' and 13' has been increased the same amount. These relative movements of pistons 17 and 17' in the cylinders 11 and 11' would be forced by the flow of the liquid between chambers 15 and 15' and between chambers 16 and 16'. It will be noted that the caster angle of the right wheel, $\theta R$, is greater than the caster angle of the left wheel, $\theta L$, and that the right wheel has turned away from the side on which its caster spindle is located.

It will be apparent to one skilled in the art that by the use of my invention it is possible to eliminate entirely the use of springs, cams or other devices to provide caster restraint. By a very simple connection between the wheels I have accomplished what has hitherto been accomplished by using a cam mechanism for each wheel. Furthermore, although cams may be used to make each wheel statically stable they can not be used to oppose turning moments due to the use of brakes because these moments are variable. It will also be apparent to one skilled in the art that with the particular embodiment of my invention illustrated herein the application of one brake for steering purposes will cause the wheels to turn in the desired direction as well as apply a turning moment on the airplane to cause it to turn in the desired direction.

It will be obvious to one skilled in the art that it would be possible to so design the undercarriage that the fluid in just one of the interconnecting hydraulic tubes would be constantly under pressure and in such case the other tube and its associated damper chambers could be eliminated without departing from the scope of this invention.

I claim:

1. A cross wind undercarriage for airplanes including laterally spaced main wheels, an inclined spindle casterably supporting each of said main wheels, a caster spindle bearing spaced laterally from each main wheel for rotative support of each of said caster spindles, a radially extending arm attached to each of said spindles, another radially extended arm attached to each of said spindle bearings, the included angles between the first and last mentioned arms being between 90 and 180 degrees when the wheels are in their neutral fore and aft position, said arms being so positioned that said included angle decreases as the wheels turn about their caster axes toward the side of the wheel on which the caster spindle bearings are located, an hydraulic shimmy damper element pivotably attached to each of said first mentioned arms and to its adjacent last mentioned arm, each of said shimmy damper elements including a cylinder closed at both ends and a piston reciprocatable in said cylinder and dividing it into two non-communicating chambers, conduits connecting the symmetrically positioned chambers of the said shimmy damper elements, and a liquid completely filling said chambers and said conduits.

2. A cross wind undercarriage for airplanes including laterally spaced castered main wheels mounted on inclined caster spindles spaced laterally therefrom, an hydraulic element for each of said main wheels operated by the castering thereof and hydraulic connections between said hydraulic elements constraining said main wheels to caster in the same direction but at different rates to provide overall caster stability.

3. A cross wind undercarriage for airplanes including laterally spaced castered main wheels mounted on forwardly and downwardly inclined caster spindles spaced laterally therefrom causing one of said wheels to raise the center of gravity of the airplane when it casters clockwise and to lower the center of gravity when it casters anticlockwise and causing the other of said wheels to lower the center of gravity when it casters clockwise and to raise it when it casters anticlockwise, and linkage between said wheels constraining the first mentioned wheel to caster through a greater arc than does the second mentioned wheel when they caster clockwise and through a lesser arc when they caster anti-clockwise.

JOHN HARLIN GEISSE.

REFERENCES CITED

The following references are of record in the file of this patent:

UNITED STATES PATENTS

| Number | Name | Date |
|---|---|---|
| 1,786,649 | Gonzalez | Dec. 30, 1930 |
| 2,032,718 | Rowe | Mar. 3, 1936 |
| 2,222,850 | Maclaren | Nov. 26, 1940 |
| 2,252,660 | Kulikoff | Aug. 12, 1941 |
| 2,276,159 | Christian | Mar. 10, 1942 |
| 2,299,613 | Cleveland et al. | Oct. 20, 1942 |
| 2,345,405 | Maclaren | Mar. 28, 1944 |
| 2,402,428 | Mitten | June 18, 1946 |
| 2,474,630 | Jamison | June 28, 1949 |

FOREIGN PATENTS

| Number | Country | Date |
|---|---|---|
| 533,112 | Great Britain | Feb. 6, 1941 |